Sept. 3, 1946. R. E. CHOATE ET AL 2,406,944
VEHICLE
Original Filed Sept. 21, 1940 9 Sheets-Sheet 1

Inventors
ROY E. CHOATE
AND
ELLSWORTH W. AUSTIN
By
Attorney

Sept. 3, 1946.  R. E. CHOATE ET AL  2,406,944
VEHICLE
Original Filed Sept. 21, 1940   9 Sheets-Sheet 3

Inventors
*ROY E. CHOATE*
AND
*ELLSWORTH W. AUSTIN*
By
Attorney

Sept. 3, 1946.   R. E. CHOATE ET AL   2,406,944
VEHICLE
Original Filed Sept. 21, 1940   9 Sheets-Sheet 4

Inventors
ROY E. CHOATE
AND
ELLSWORTH W. AUSTIN
Attorney

Sept. 3, 1946.  R. E. CHOATE ET AL  2,406,944
VEHICLE
Original Filed Sept. 21, 1940   9 Sheets-Sheet 8

Inventors
ROY E. CHOATE
AND
ELLSWORTH W. AUSTIN
By
Attorney

FIG. 11.

Patented Sept. 3, 1946

2,406,944

UNITED STATES PATENT OFFICE 2,406,944

VEHICLE

Roy E. Choate and Ellsworth W. Austin, Cedar Rapids, Iowa, assignors to LaPlant-Choate Manufacturing Company, Incorporated, Cedar Rapids, Iowa, a corporation of Delaware Original application September 21, 1940, Serial No. 357,672, now Patent No. 2,347,882, dated May 2, 1944. Divided and this application September 13, 1943, Serial No. 502,114

12 Claims. (Cl. 180—51)

Our invention relates to a vehicle particularly adapted for excavating, transporting, discharging and leveling earth or comparable material, this application being a division of our application Serial No. 357,672, filed September 21, 1940, for an Excavator which issued as Patent No. 2,347,882.

At the present time it is customary in most commercial operations to provide the excavating machine with a separate tractor, usually of the track-laying type, arranged at the front of the excavator, to draw the excavating machine over the ground during most of the operation. Sometimes, especially during actual digging, if power is scant, an additional tractor is brought up behind the excavator and acts as a temporary pusher or booster. This arrangement is feasible where extra operators and equipment are available and where there is a good deal of room for maneuvering. There is no satisfactory reversing action available, however, and even if the tractor is operated in the very slow speed reverse, steering is difficult partly because of the type of draft hitch employed. In long haul operations, this is of little importance, but in short haul operations, the time spent turning around at the end of the digging trip and at the end of the return trip may amount to ten or twenty per cent of the total time. An excavator which can be operated and accurately steered at high speed in reverse is obviously advantageous in this type of work.

The power requirements of a vehicle of this type are very severe. On relatively long hauls a representative size of excavator will carry about thirty cubic yards of material about forty miles per hour. This is accomplished with the vehicle going rapidly with respect to the engine. During excavating, a deep cut in hard material may require the full engine power at maximum engine speed yet at a very low vehicle speed. A number of different gear ratios are advisable, but changes from one ratio to another should be made almost instantly to avoid loss of momentum. Hence an automatic transmission is highly desirable.

One of the objects of our invention is the provision of an improved vehicle particularly adapted for use as an excavator.

Another object of our invention is the provision of a vehicle provided with its own booster power-plant.

Still another object of our invention is the provision of a vehicle in which the power-plant is arranged so that the weight of the power plant is well distributed over the ground-engaging wheels.

Another object of our invention is the provision of a vehicle in which the drive from the power-plant to the wheels is generally positive yet which is sufficiently flexible to permit ready maneuvering.

Another object of our invention is the provision of a vehicle capable of being driven in a reverse direction for maneuvering in cramped quarters.

A further object of our invention is to provide an excavator which is largely automatic in operation so that a single operator can handle large loads at very high speed.

Another object of our invention is to provide an excavator in which the amount of excavation is automatically regulated for maximum performance of the vehicle.

The foregoing and other objects are attained in the embodiment of the invention illustrated in the drawings, in which

Fig. 6 is a cross-section the plane of which is indicated by the line 6—6 of Fig. 4;

For the purposes of illustration, our vehicle has been shown in the form of an excavator including a main frame and main bowl structure, the elements of which are articulated for relative motion about a transverse axis and which are provided with means for controlling such motion. Each of the elements is supported on ground-engaging wheels, the rear pair of which are driven by an associated source of power, and the front pair of which not only are steerable but are driven from their own associated source of power. The sources of power are under the control of the vehicle operator and transmit their driving force through hydraulic couplings and automatically shiftable ratio-changing transmissions responsive to the speed of the respective driven wheels. The drive is also transmitted through reversing gears under operator control and through differential gears under automatic control responsive to the steering for locking the differentials. The earth-handling devices, that is, the main bowl, the pusher and the auxiliary bowl, are power-actuated by operator-controlled cable-winches and hydraulic cylinders.

The excavator structure 11 is supported upon a pair of rear ground-engaging wheels 12 and a pair of front ground-engaging wheels 13 and is made up of a rear, main bowl section 14 articulated to a front, main frame section 16 for relative rotation about a transverse horizontal axis 17. Relative rotation about the axis is controlled by double acting hydraulic piston and cylinder structures 18 pivotally mounted on the frame 16 and connected through stopped bell-cranks 19 to the main bowl section 14. The various instrumentalities within and associated with the main bowl, including the bell-cranks 19, are substantially as shown in the above-identified Austin application. These instrumentalities generally comprise an earth discharge or pusher member 21 which is translatable within the main bowl 14 and which is connected by an articulation 22 to an earth-retaining member 23 or auxiliary bowl or front apron which in turn is connected to the main bowl through a pair of links 24, so that upon forward movement of the pusher 21 the front apron 23 rises, while upon return or rearward translation of the pusher 21 the front apron 23 closes.

Figure 1:
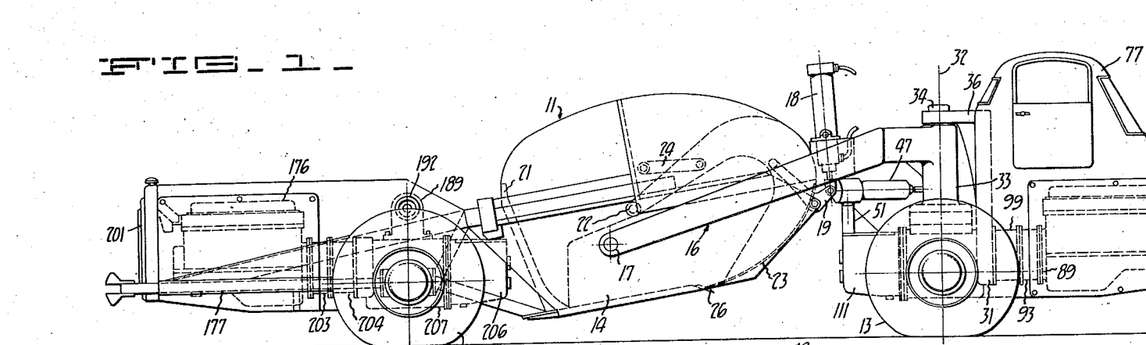
Fig. 1 is a side elevation of a vehicle in the form of an excavator embodying the objects of our invention.
Figure 2:
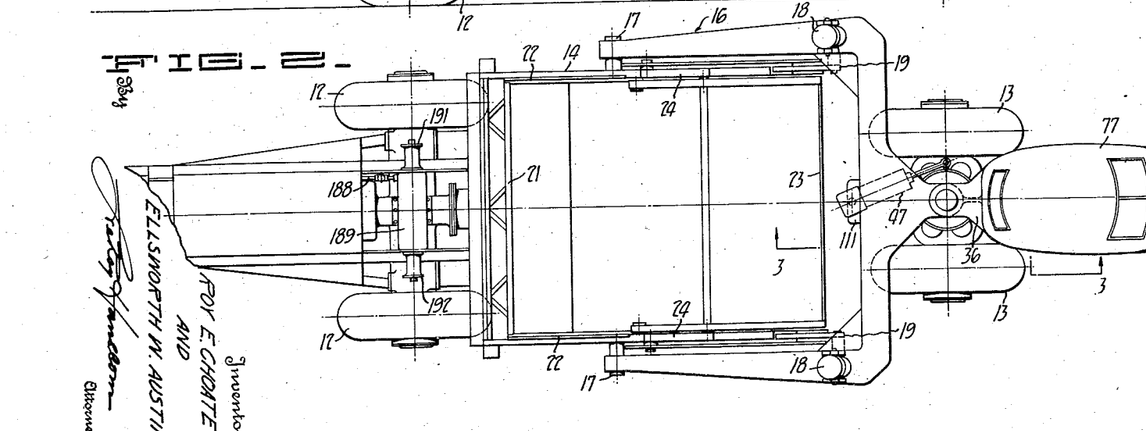
Fig. 2 is a plan of the excavator shown in Fig. 1.

While the front apron is open, material is either discharged from or loaded into the main bowl over a cutting edge 26 disposed approximately midway of the length of the main bowl structure. Upon appropriate operation of the hydraulic cylinders 18, the cutting edge 26 can be raised to its carrying position as shown in Fig. 1, or can be lowered therefrom to a maximum cutting position below the surface of the ground, such movement being accompanied by relative rotation of the main bowl section 14 with respect to the main frame section 16 about the transverse axis 17 and also about the rotational axes of the rear wheels 12 and the front wheels 13. When the hydraulic cylinders 18 are not actuated, but the liquid is blocked therein, they function as restraining or locking means to prevent unwanted or erratic relative rotation of the main bowl and main frame members, thereby preserving the selected position of the various parts under the control of the operator.

The forward portion of the main frame 16 is connected to and includes a steering member 31 which is mounted for relative rotation with respect to the main frame about a vertical axis 32, and since the front wheels 13 are connected to the steering member there is thus provided a means for effectuating steering movement of the entire vehicle, the extent of steering motion of the front wheels being a rotation of substantially 90 degrees in either direction from the straight-ahead position, so that the vehicle can be steered with its front wheels traveling in a direction at right angles to the direction of the rear wheels. This permits very abrupt turning and sharp maneuvering of the vehicle in cramped quarters. The steering member 31 is primarily a hollow casing having (Fig. 5) a king pin 34 therein also mounted within a central mast 33 forming part of the main frame. The king pin 34 is extended to form a pivot connection with a knuckle frame 36 preferably integral with the steering member 31.

Figure 4:
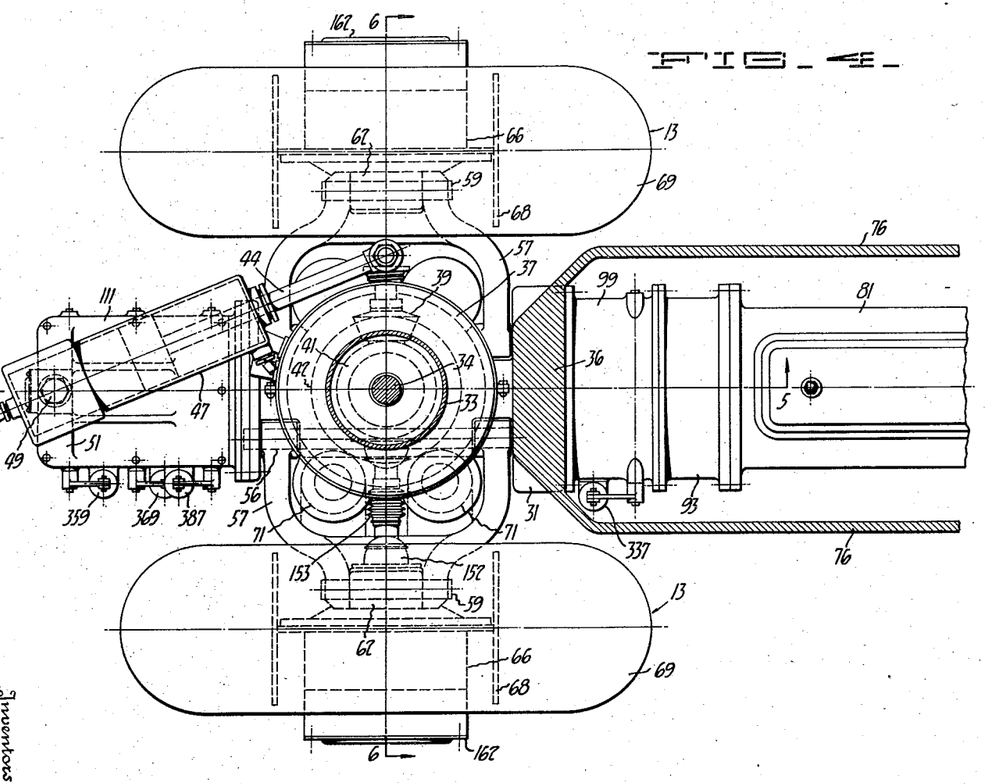
Fig. 4 is a cross-section the planes of which are indicated by the line 4—4 of Fig. 3.

In order to effectuate relative steering rotation between the main frame mast 33 and the steering member 31, there is mounted on the casing 31 within a steering compartment 37 a bevel ring gear 38 with which meshes (Fig. 6) a steering bevel 39 journaled on a collar 41 and also meshing with bevel ring gear 42 within the compartment and fast on the mast 33. An extension 43 of the collar 41 forms a pivotal mounting for a piston rod 44 of a hydraulic steering structure (Fig. 4). A double-acting steering cylinder 47 is at one end mounted on a pivot pin 49 fast with respect to the steering member 31 and disposed on an extended bracket 51 materially spaced from the king pin 32.

Upon appropriate control of oil flow to and from the chambers of the cylinder 47, the piston rod 44 is advanced or retracted to rotate the extension 43 and to move the bevel 39, so that relative rotation takes place between the ring gears 38 and 42, thus producing relative rotation between the steering member 31 and the mast 33 of the main frame. The gear reduction employed is at a ratio of two to one, so that, for 90 degrees angular motion of the extension 43, 180 degrees angular motion of the steering member with respect to the steering mast 37 is provided. Also by use of this mechanism, and because of the resistance to flow of the hydraulic fluid utilized, the steering member 31, despite extraneous shocks, remains substantially in the selected position, although the operator can, if desired, permit some seepage or leakage in order that a dashpot effect may be provided.

Steering movement is imparted from the steering member 31 to the front ground-engaging wheels 13, through supporting structures which connect the front wheels to the rest of the vehicle. These supporting structures are substantially identical on opposite sides of the center, and hence a description of one applies to both. Mounted upon the steering member 31 are parallel rods 56 serving as pivotal mountings for a pair of support levers 57 and 58 fulcrumed on the steering member at their inner ends and at their outer ends connected by parallel pivots 59 and 61 to the enlarged plate end 62 of an axle tube 63. On the axle tube are disposed bearings 64 and 65 rotatably supporting a wheel 66 provided with detachable connectors 67 securing it to a rim 68 on which a ground-engaging pneumatic tire 69 is mounted.

By this arrangement not only does the tire, rim and wheel unit revolve upon the axle tube 63, but likewise the wheel assembly rises and falls with respect to the steering member 31 as permitted by the rising and falling movement of the levers 57 and 58. Thus, rotational movement of the steering member about the central vertical axis 32 is accompanied by a corresponding movement of the wheels in unison therewith, to accomplish steering of the excavator while rising and falling movement of the wheels to accommodate for irregularities in the ground is permitted. This accommodation is resiliently restrained. Interposed between pads on the steering member 31 and pads on the plate 62 is a pair of coil springs 71 for transmitting the weight of the vehicle to the ground-engaging wheels. Another pair of springs is symmetrically arranged, and with this suspension arrangement the steering axis 32 may remain substantially in a vertical position while either of the front ground-engaging wheels can accommodate itself to irregularities in the terrain independently of similar accommodating movements by the other wheel.

In order to provide a support for the operator's station and for propulsion mechanism, the steering knuckle frame 36, approximately midway of its height, is extended to provide a substantially horizontal beam platform 76 which forms the floor of an operator's cab 77 containing a seat 78 for the operator and a steering wheel 79, together with other control instrumentalities, and from which the operator can see not only ahead but also behind into the earth-excavating structure, for full visual observation of the entire operation.

Situated beneath and partially supported by the floor beam 76 is a source of power, such as an internal combustion engine 81. This powerplant is peculiar or individual to the front ground-engaging wheels which are driven thereby, and furnishes substantially half of the total power supplied to the vehicle. The engine is preferably water-cooled, with the radiator structure 82 forming a link to assist in supporting the engine, and derives fuel from a tank 83 disposed beneath the driver's seat 78. The engine 81 not only supplies power directly to the vehicle but also has a power take-off housing 84 from which a shaft 86 projects to drive an air-pump 87 to supply compressed air for operating various instrumentalities and likewise to drive a hydraulic or oil pump 88 for operating other instrumentalities.

The engine itself terminates in a standard bell housing 89 in which the engine crank-shaft 91 is journaled and which bolts to a housing 93 for a hydraulic coupling. This comprises a toroidal drive member 94 operating on and with the crank-shaft 91 and driving, by hydraulic connection, a toroidal driven member 96 mounted on a driven shaft 97 extending to a reversing mechanism, generally designated 98, contained within a housing 99. This housing is preferably bolted to the coupling housing 93 and to a receiving face on the steering member 31.

Figure 5:
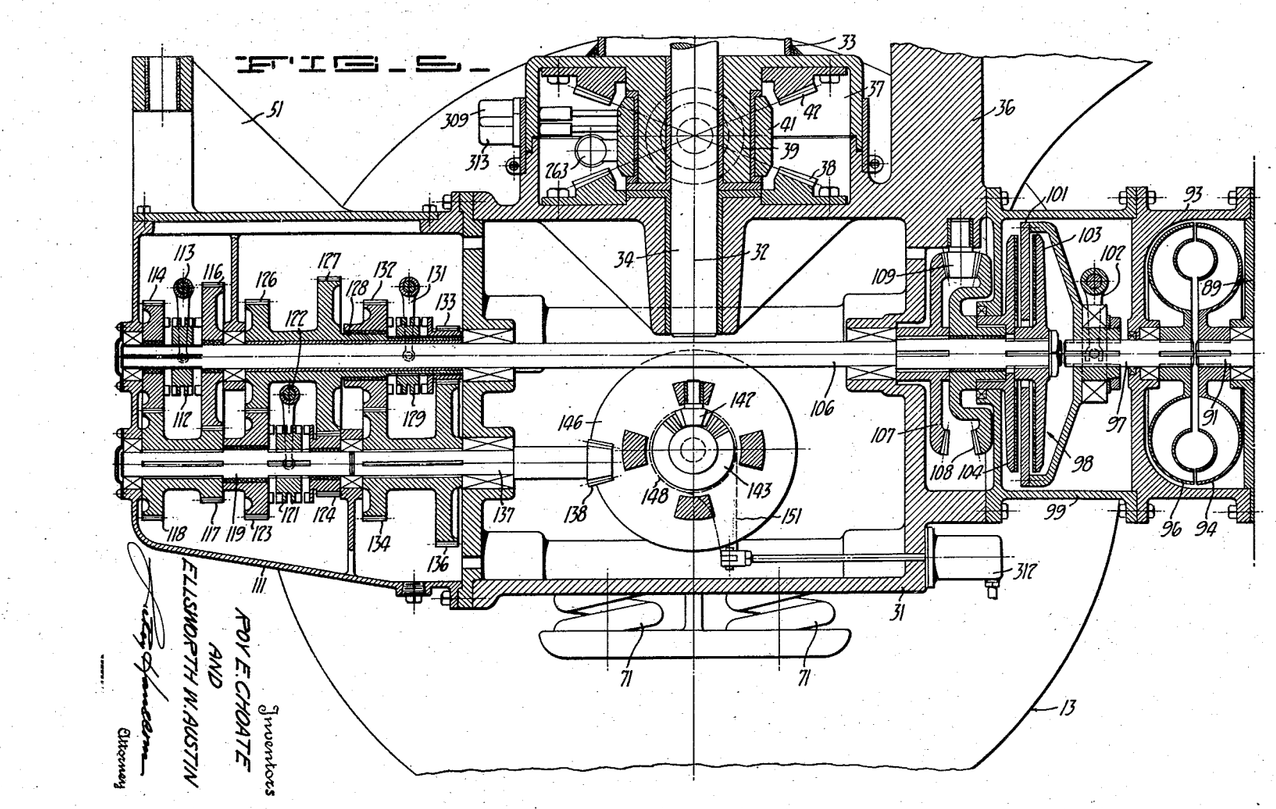
Fig. 5 is a cross-section the plane of which is indicated by the line 5—5 of Fig. 4.
Figure 7:
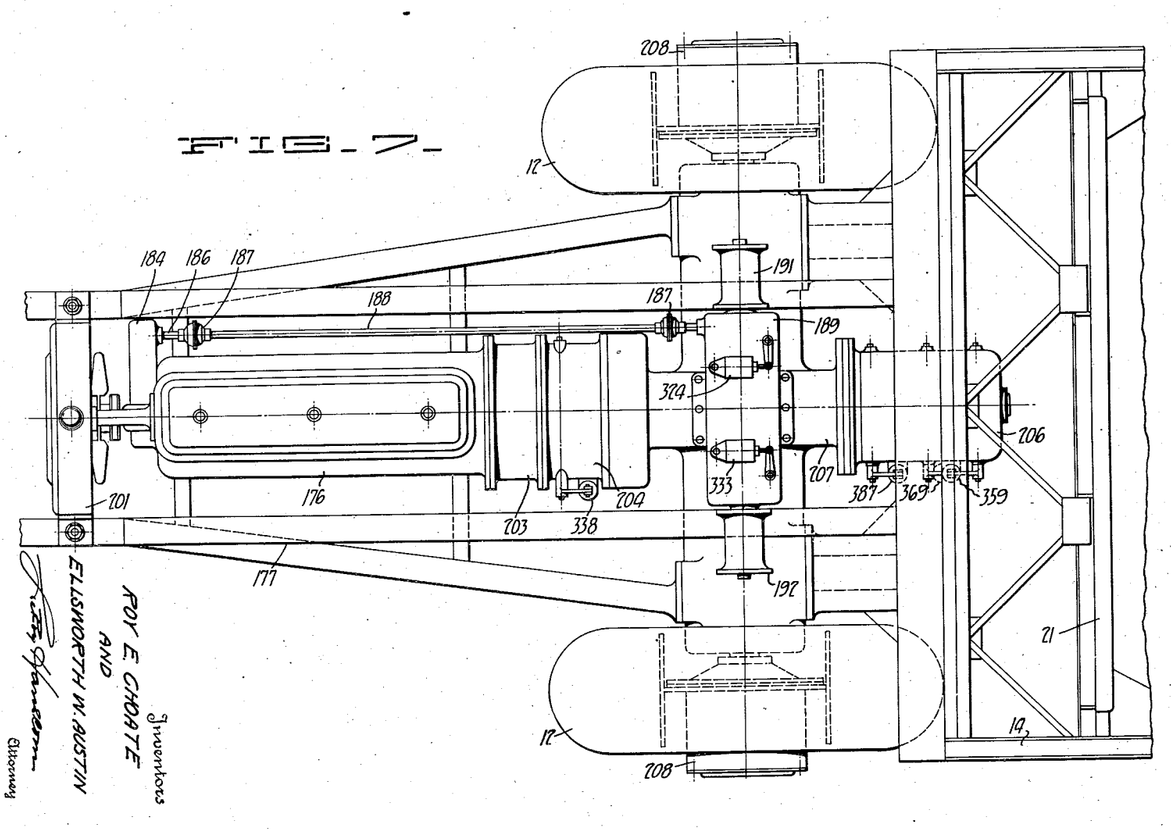
Fig. 7 is a plan, portions of the enclosing casing being removed, of the rear portion of our excavator.

We prefer that the reversing gear be capable of driving the vehicle in either direction at maximum speed and power so that the excavator not only can advance at maximum rate into a narrow cut, for example, but can also retract from such a cut and thus perform a maneuver which cannot be performed by present excavating structures. For that reason, the reversing mechanism takes the form of a driving disc 101 which has a middle, neutral position, as shown in Fig. 5, and may be shifted by a shifting fork 102 in either direction out of the neutral position, either forwardly into frictional engagement with a driven member 103 or rearwardly into frictional engagement with a second driven member 104. While the driving and driven members engage frictionally, it is not intended that they act primarily as slipping clutches, but rather the interengagement between the driving member 101 and either of the driven discs 103 and 104 is relatively abrupt, any large difference in speed being gradually absorbed by the hydraulic coupling 93.

The driven member 103 is connected directly to a transmission shaft 106 which extends through the steering housing 31 and which carries a bevel side gear 107. The driven member 104, however, is connected to a bevel side gear 108. Together these are freely rotatable with respect to the shaft 106, yet the gear 108 is connected with the bevel gear 107 through pinion gears 109 restrained against planetary rotation and mounted in journals within the housing 31. With this arrangement, when the disc 101 is in neutral position, no power is transmitted from the driven shaft 97 to the shaft 106. When the disc 101 is in frictional engagement with the disc 103, power is transmitted directly to the shaft 106 and turns it in the same direction as the engine crank-shaft 91 rotates. When, however, the disc 101 is in contact with the disc 104, this latter disc then rotates in the same direction as the engine crank-shaft, but this direction of rotation is reversed through the pinion gears 109, so that the gear 107 and the shaft 106 are then rotated in a direction opposite to the direction of rotation of the crankshaft 91. There is, however, no speed change by means of this reverse gear transmission, so that there is provided either a complete neutral disconnection or full power transmission in either of two opposite directions. This is all under the control of the shifting fork 102 which is itself controlled by the vehicle operator.

In addition to the reversing mechanism, we provide a ratio-changing mechanism between the source of power and the ground-engaging wheels, and this preferably takes the form of a spur gear transmission located in a casing 111 bolted on the rear of the steering member 31 and also forming a support for the bracket 51 previously described. Any suitable ratio-changing mechanism can be utilized, and any desired number of ratios can be afforded, but for example herein we have disclosed an arrangement which is under the control of the operator or which is automatically actuated and provides a choice of any one of eight speeds or ratios. This, in conjunction with the reversing mechanism, affords eight speeds rearwardly and eight speeds forwardly between the engine and the ground-engaging wheels.

In the ratio-changing transmission the transmission shaft 106 carries a driving dog clutch 112 under the control of a shifting fork 113 and movable from a neutral position into either of two extreme positions in engagement either with a gear 114 or with a gear 116. Each of these gears is freely rotatable upon the shaft 106 until it is coupled thereto by the dog clutch 112 upon operation of the shifting fork 113. Meshing with the gears is a pair of cluster gears 117 and 118, respectively, which are fast on a countershaft 119. Also fast on this shaft is a second shifting dog clutch 121 under the control of a shifting fork 122, so that upon operation of the fork the clutch 121 couples to the countershaft 119 either of two gears 123 and 124. These in turn mesh with a pair of cluster gears 126 and 127 integral with a quill 128 revolving around the transmission shaft 106. Fast on the quill, so far as rotation is concerned, but shiftably slidable thereon, is a dog clutch 129 under the control of a shifting fork 131 for engaging either of two gears 132 and 133 with the quill. These gears respectively mesh with cluster gears 134 and 136 which are fast on a driven shaft 137. Since there are three shifting forks 113, 122 and 138, each of which has two shifted positions with a different gear ratio effective in each, by appropriately shifting these forks a total of eight different ratios is obtainable.

After the speed ratio has been established in the transmission casing 111, the drive is taken from the shaft 137 through a pinion 138 meshing with a ring drive gear 139 mounted on a differential spider 141 journaled within the steering member 31. Differential pinions 142 are carried by the spider 141 and mesh with side gears 143 and 144. Ordinarily, the drive from the ring gear 139 is transmitted to the spider and is divided evenly by the pinions 142 to the two side gears 143 and 144 for appropriate distribution to the ground-engaging wheels. Under certain circumstances, however, we prefer that the differential mechanism be rendered inoperative or be disabled to divide the power, so that in fact the driving wheels are locked together for rotation in unison with the drive gear 139. This is of particular value when the vehicle is negotiating very rough terrain with different traction conditions in different localized areas thereof, and for that reason we provide a differential locking mechanism which precludes any power or torque differential between the wheels on opposite sides of the vehicle.

Extending from the spider 141 is a friction disc 146 with which can be engaged a friction disc 147 axially movable on but splined to the hub of the side gear 143. Axial movement is provided by a shifting collar 148 having an interengaging serrated connection 149 with a non-rotatable thrust hub abutting the disc 147. The collar 148 is controlled for partial rotation by an actuating lever 151, so that normally the actuating lever 151 is in a position with the serrations 149 nested and the discs 146 and 147 out of engagement. This permits free differentiation. But when the lever 151 is slightly rotated, the serrations 149 are relatively moved, thereby translating the disc 147 axially into frictionally locked engagement with the disc 146 so that the side gear 143 is immovably locked to the spider 141 and the entire differential mechanism therefore revolves as a unit with the driving ring gear 139.

From the side gears 143 and 144 the drive on each side of the center line is exactly symmetrical, so that a description of one side will suffice.

The side gear 143, for example, has its hub extending through and journaled in the wall of the steering member casing 31 to connect with a universal joint (not shown) enclosed in a ball housing 152 from which a sliding joint (not shown) encased in a telescoping housing 153 transmits the drive to a second universal joint (not shown) in a ball housing 154. In this fashion the drive is transmitted between the relatively stationary steering member and the vertically movable wheel. From the interior of the universal joint ball 154 there projects an axle 156 journaled within the axle housing tube 63 and extending to a final gear reduction. This final gear reduction is preferably of the planetary type and is entirely contained within the interior of the wheel housing 66. It includes a sun gear 157 at the end of the axle 156, which meshes with a plurality of star gears 158 journaled on a spider 159 stationary with the axle housing tube 63 and in turn meshing with a driven ring gear 161 fast on the wheel housing 66 and enclosed by a cover plate 162. By this arrangement of final drive gears it is possible to have a relatively high-speed and small drive axle 156 yet a relatively slow speed of the ground-engaging wheels.

We preferably provide means for braking the vehicle, and, as an example, utilize a portion of the wheel housing 66 as a brake drum. Within such drum and pivotally mounted on a brake plate 163 splined on the axle housing tube 66 are brake shoes 164 which are fluid actuated by an interior cylinder 166 connected by a fluid conduit 167 and passages 168 in the axle tube to a connection 169 going to the operator's control station in the customary fashion.

Not only is a driving and braking structure employed with the two front ground-engaging wheels 13 from a front engine 81, but in an entirely similar fashion, except for the steering and the articulated, resilient suspension, there is provided at the rear of the vehicle an entirely separate and independent engine 176 which is disposed in a rearward extension 177 of the main bowl structure 11. This arrangement behind the rear ground-engaging wheels 12 is substantially symmetrical about the center of the earth-carrying structure with the engine disposition relative to the front ground-engaging wheels, so that the weight is at all times uniformly distributed. The engine 176 is entirely comparable to the engine 81 and is similarly provided with a power take-off 184 and a power take-off shaft 186 which connects through universal joints 187 and a driveshaft 188 to a winch mechanism 189. This winch structure is operator-controlled and preferably is provided with a pair of independently actuated drums 191 and 192, each of which is normally left in a braked position but may be freed for unhampered rotation or can be connected for power driving to the engine 187, all under the control of the operator.

Figure 9:
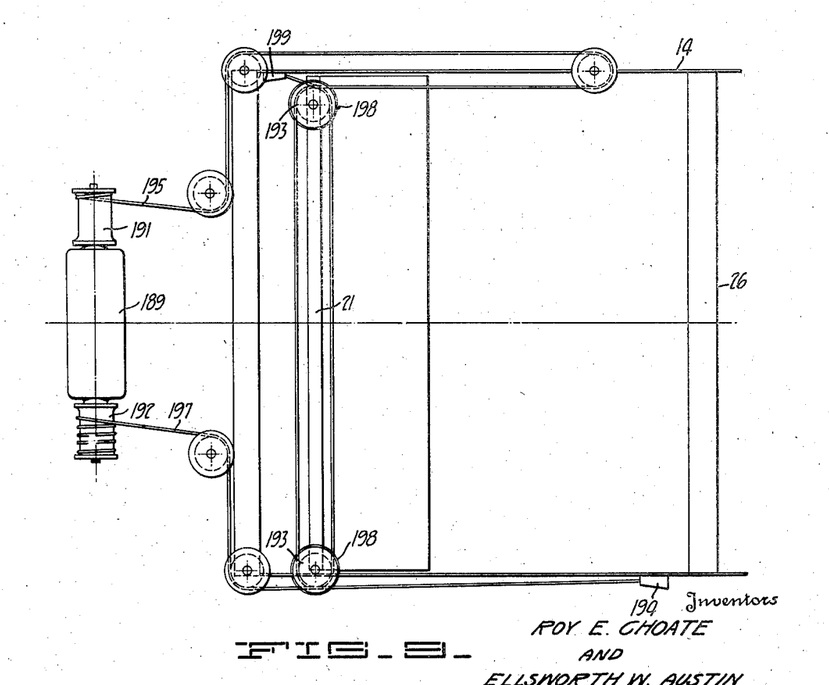
Fig. 9 is a diagrammatic plan of the cable arrangement of our excavator.

As particularly shown in Figure 9, the winch 191 is provided with a cable 195 which extends about pulleys 193 on the pusher 21 to an anchorage 194. Thus, when the winch 191 is energized, the pusher 21 is urged forwardly. Similarly, the winch 192 is provided with a cable 197 extending around pulleys 198 on the pusher 21 to an anchorage 199, so that when the winch 192 is power-operated, the influence of the cable 197 is to retract or withdraw the pusher 21 toward its rearmost position.

The engine 176 is provided with its own radiator 201 and similar appurtenances and is connected to the rear ground-engaging wheels 12 in exactly the same fashion as the front engine 81 is connected to the front wheels, but there is no power connection between the two engines. There is, however, within a housing 203 a duplicate of the hydraulic coupling 94, and within a housing 204 there is a duplicate of the reversing gear 101. Also, within a transmission housing 206 there is a duplicate of the ratio-changing mechanism contained within the housing 111. The rear ratio-changing transmission is effective to drive a rear differential mechanism provided with a locking clutch and identical with that afforded for the front wheels. The rear differential is disposed within a central housing 207 on which the winch structure 189 is mounted and which is included in and connected to the main frame 11 of the excavator. The rear wheels 12 are suitably provided with final gear reductions within the wheel housing 208 and, although they are mounted for rotation, are not steerable nor independently articulated for rising and falling movement due to road irregularities.

Except, therefore, for the steering and suspension mechanisms, the rear ground-engaging wheels 12 are driven from their separate engine and are operated in exactly the same fashion as are the front ground-engaging wheels and are provided with identical control instrumentalities in every respect. All of the control instrumentalities for the rear engine 176 are brought forwardly and are grouped with the control instrumentalities for the front engine 81 within and for operation by an operator in the cab 77.

Figure 10:
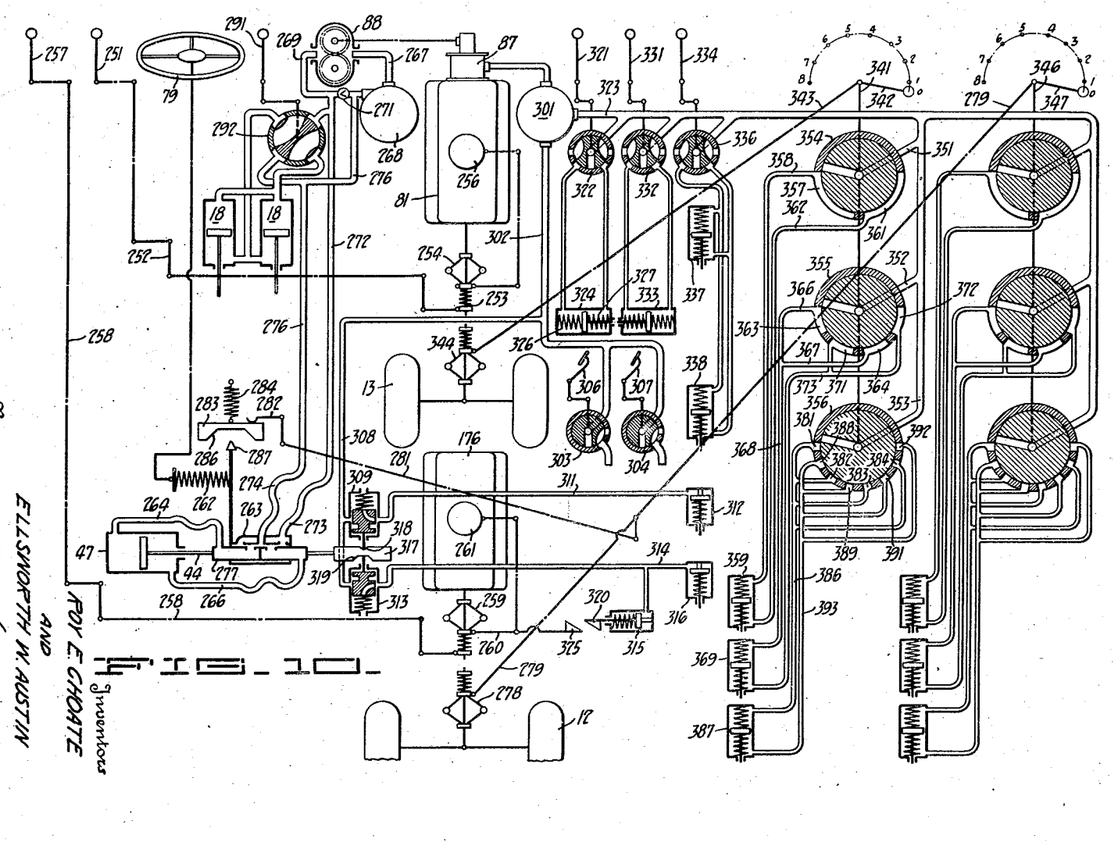
Fig. 10 is a schematic diagram of the controls of our excavator.

The general operation of the control instrumentalities, while partially at the discretion of the vehicle operator, is also partially automatic in response to various selected functions, and, while the control elements themselves are illustrated in the remaining figures, they are diagrammatically shown in their functional relationship in Fig. 10.

Preferably, all of the control instrumentalities are arranged within convenient operating distance of the operator stationed within the cab 77 and are connected as diagrammatically illustrated in Fig. 10. To control the power output of the front engine 81 there is provided a throttle or governor controller 251 constituted by an operating handle connected by linkage 252 to the spring 253 of an engine governor 254. By varying the tension of the spring, the effect of the governor 254 on the fuel supplier 256 of the engine 81 is varied. Thus, for any given or set position of the lever 251, the engine is automatically maintained by the governor 254 at substantially the established level of output. Similarly, and arranged in very close juxtaposition to the lever 251, is a controller 257 which is connected by linkage 258 to the speed governor 259 of the engine 176, the governor being likewise connected by a rod 260 to the fuel supplier 261 of that engine. Since the levers 257 and 251 are arranged close together, they either can be simultaneously operated as a unit by the vehicle operator so as to produce identical changes in operating characteristics of both engines, or can be individually operated for different power output from each engine.

Figure 3:
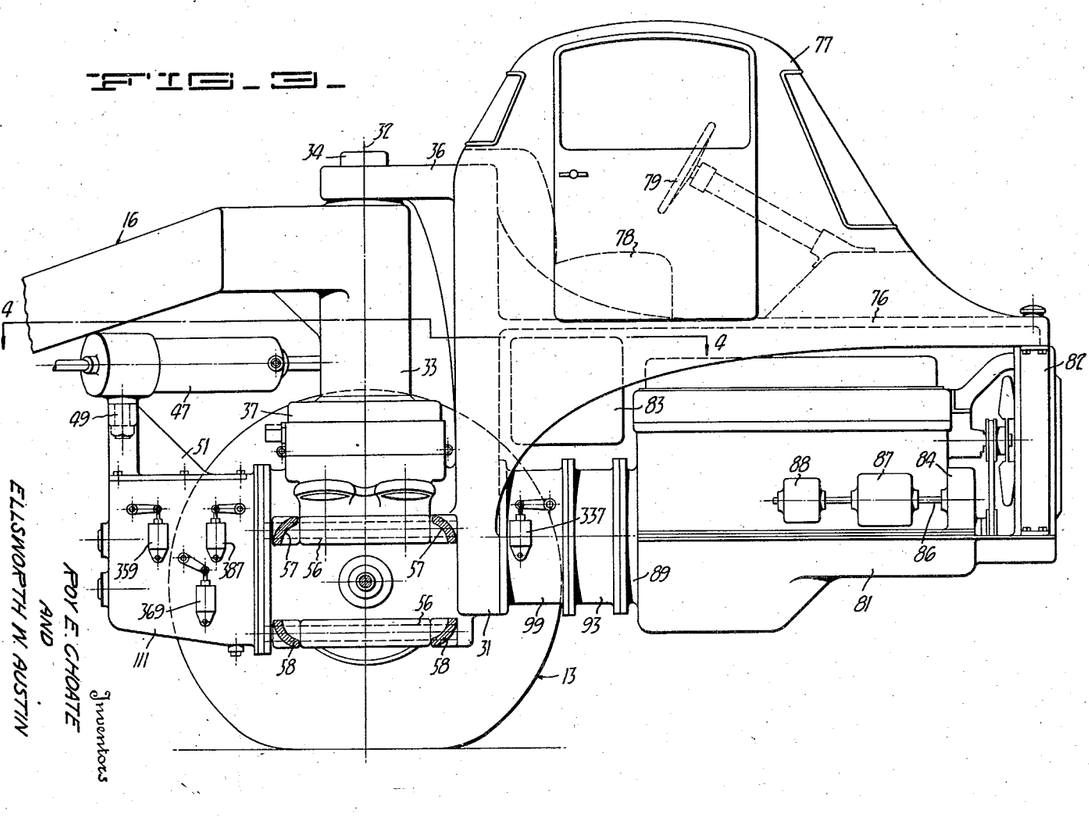
Fig. 3 is a cross-section the planes of which are indicated by the lines 3—3 of Fig. 2.

For usual operation of the vehicle, the controllers 251 and 257 are operated together and uniformly, so that both engines 81 and 176 produce substantially equivalent amounts of power and produce substantially equal torques at the driving wheels. In this type of operation the engine 81, in propelling the vehicle forward, produces a torque reaction which tends to move the forward portion of the main frame in a counter-clockwise direction (Fig. 3) about the axis of the front ground-engaging wheels, whereas the rear engine 176 produces a driving torque reaction which tends to rotate the rear portion of the main frame and main bowl structure also in a counter-clockwise direction (from the same viewpoint) about the axis of the rear wheels. These torque reactions, being exactly equal, neutralize each other and do not tend to produce any rotation about the transverse axis 17.

Under other types of operation, however, the two engines 81 and 176 are individually operated by individual manipulation of the levers 251 and 257 to produce different torque effects upon the front wheels and the rear wheels; and since the driving torques are in different amounts, the corresponding reactions tend to induce a relative rotation of the main frame and main bowl structure about the transverse axis 17. This is normally resisted by the hydraulic cylinder mechanism 18. Since these are under the control of the operator, the torque reactions can be utilized for relatively rotating the parts of the structure. The individual controls for the engines are particularly valuable in operating the vehicle where very sharp turns are made and especially where the terrain is exceedingly rugged and contains chuck holes or mud holes, since, by selective application of the motive power, advantage may be taken of the most favorable traction. But for all ordinary purposes under reasonably favorable conditions, both of the controllers 251 and 257 are operated in strict conjunction.

For controlling the steering of the vehicle, the operator is provided with the steering wheel 79 which is connected through a resilient means, such as a spring 262, with a bodily movable follower valve 263. This follower valve controls the flow of hydraulic fluid through conduits 264 and 266 to opposite ends of the cylinder 47, so that as the steering wheel 79 is turned, the follower valve 263 produces an equivalent displacement of the cylinder and, correspondingly, an equivalent turning of the ground-engaging wheels. The wheels consequently are turned by power and are held in positions at all times corresponding to the turned position of the steering wheel.

To supply not only the cylinder 47 but likewise the other hydraulic instrumentalities with a supply of hydraulic fluid, the pump 88 has its intake 267 extending to a tank 268 and discharges through an outlet conduit 269. A by-pass check valve 271 regulates the pressure within the outlet conduit, returning any excess of fluid to the tank 268. A follower valve pressure pipe 272 extends through a flexible connection 273 to the follower valve and supplies appropriate chambers within the valve with pressure fluid. A return flexible conduit 274 is connected to a return pipe 276 extending to the tank 268. The port arrangement within the follower valve is such that as the valve is moved in response to the steering wheel rotation, the pressure fluid is communicated through the valve body 277 to the appropriate portion of the cylinder 48, so that for any degree of steering wheel rotation the front wheels are steered an equivalent amount through the intervening servo action of the follower valve and the hydraulically actuated cylinder.

Since the steering of the vehicle is of the central pivot or "fifth wheel" type, it is deemed desirable progressively to limit the amount of turning angle with increasing speed, so that, while the vehicle is fully maneuverable when it is operating at low speed and in cramped quarters, the amount of turning which can be effected at higher speeds is progressively decreased as the vehicle speed increases. Since the excavator is intended to haul very heavy loads of earth at a relatively high rate of speed, an automatic means is provided for insuring stability by precluding excessive steering movement; that is, by reducing the range of possible steering as the speed is increased.

For this reason, there is driven by the rear wheels 12, or is responsive to the speed thereof, an excavator speed governor 278 which translates a controller 279 as the vehicle speed increases. The movement of this controller is likewise transmitted through a similar control rod 281 fastened thereto and effective through a link 282 to translate a restraining block 283 against the urgency of a return spring 284. The block has a cam face 286 which is contoured to cooperate with a cam 287 moving simultaneously with and fast upon the follower valve 263. When the parts are in the position shown in Fig. 10, which is the low-speed position, there is no restriction whatsoever upon the transverse translatory movement of the cam 287, and full steering may be obtained. But as the speed of the vehicle increases, the governor 278 actuates the control rods 279 and 281 and, through the connection 282, tensions the spring 284 by translating the block 283 toward the cam 287. When that is done, the cam face 286 progressively limits the translatory movement of the cam, and when the cam block is fully in contact with the cam 287 the translatory movement thereof is limited to a predetermined amount—for example, 30 degrees of steering of the front wheels each side of center position.

Since the steering wheel 79 is connected to the follower valve 263 by means of a resilient connecting spring 262, even if the operator should operate the wheel 79 beyond the permissible 30 degree limit at high speed, for example, the cam block 283, being actuated by a superior force, will restore the cam 287 and the follower valve 263 toward central position sufficiently to bring the steering within the established maximum range at that speed. Thus, while steering is entirely free at relatively low speeds and is restricted to a predetermined maximum amount at high speeds, the range of restriction gradually varies between the low-speed and high-speed limits as the cam 287 is contacted by successive portions of the cam face 286. This mechanism provides an automatically effective means for precluding dangerous steering at the higher speeds.

Arranged for convenience next to the steering wheel 79 is a controller 291 which is effective to rotate a conventionally illustrated hydraulic valve 292 for controlling the supply of hydraulic fluid through the supply pipe 269 to the cylinders 18 connected in parallel, and the discharge of fluid therefrom through the discharge pipe 276. These are the cylinders which determine the resistance of the mechanism to torque reactions of the engines when driving and also govern the position of the cutting edge 26. By appropriately operating the controller 291 the operator can admit, release or hold hydraulic fluid within the cylinders 18 to retain the parts locked in position or to move the parts to any selected other position within the total range of movement.

While many other control instrumentalities on the excavator can be hydraulically actuated, it is preferred, in the present embodiment, to utilize hydraulic actuation only for the steering and for the cylinders 18. The remaining power-operated instrumentalities are preferably operated through the medium of compressed air. Thus, the compressor 87, driven by the forward engine 81, supplies air under a predetermined regulated pressure to a tank 301. From the tank a pressure line 302 extends to valves 303 and 304 which control the brakes on the front wheels and on the rear wheels respectively. The valves 303 and 304 are provided with individual pedals 306 and 307 located side by side and convenient to the driver in the operator's cab, so that the front end of the device may be braked separately from the rear end. The braking produces torque reactions quite similar to those produced by the engine driving forces, except that they occur in a reverse direction and, unless exactly equal (in which case they neutralize), are also resisted by the double-acting hydraulic chambers 18. While ordinarily the operator controls both of the pedals 306 and 307 in unison, this being facilitated by their location in juxtaposition, the operator can, since the brake pedals are separate, individually control the brakes to facilitate maneuvering of the vehicle.

In accordance with our invention, and in order to assist in the versatility and maneuverability of the vehicle, we provide means for permitting the differential mechanisms, such as 141, normally to function when the vehicle is turning a substantial amount but to render the differentials inoperative or to disable them when the vehicle is going in a straight path or approximately so. Further, we preferably arrange matters so that the front differential mechanism and the rear differential mechanism are disabled under different conditions. For that reason, the air pressure line 302 has a branch line 308 extending to a control valve 309 spring-pressed into inoperative position normally but effective when operated to establish connection between the branch 308 and an air line 311 extending to an operating chamber 312 connected to the lever 151 for operating the locking clutch on the front differential. The branch 308 likewise extends to a control valve 313 normally ineffective but, when actuated, effective to establish communication through a line 314 to an operating chamber 316 of a similar character but working upon the locking clutch lever for the differential of the rear engine.

Thus, when the valve 309 is operated, the air pressure is effective to unlock the front differential, whereas when the valve 313 is actuated, the air pressure is effective to unlock the rear differential. The differential locking and unlocking is preferably responsive to steering movement. Consequently, moving in conjunction with the steering piston rod 44 there is a cam block 317 which has a narrow notch 318 on one face, ineffective when the steering is straight ahead, but effective upon a turn of approximately 5 degrees, either side of center, to translate the valve 309. Thus, while the front differential is locked for all steering positions of the front wheels between 5 degrees left of center and 5 degrees right of center, as soon as this amount of turning is exceeded, the front differential is unlocked and the drive of the front engine is distributed to the two front wheels. The rear differential, however, remains locked until the front steering approaches a value approximately 30 degrees either side of center, as governed by a wide cam notch 319 also in the block 317, which is effective to displace the controller 313. For all values of steering, therefore, substantially in excess of 30 degrees left or right of straight-ahead position, the rear differential is unlocked and the rear wheels are fully differentiated, or the power of the rear engine is then distributed to the two rear wheels in varying amounts. Upon restoration of the steering mechanism toward center position, the rear differential is relocked as soon as the range between 30 degrees left of center and 30 degrees right of center is entered, while as soon as the range between 5 degrees left of center and 5 degrees right of center is entered, the front differential is relocked.

It is considered desirable to reduce the power output of the rear engine when the front wheels are turned or steered a large amount, so that the driving force of the rear wheels does not tend to produce a skid of the front end. As a convenient way of doing this, the air line 314 is branched to connect to a controller 315 effective when energized to position a cam 320 in the path of a cam 325 mounted on the control rod 260 of the rear engine. When the front wheels are steered more than 30 degrees either side of center, the controller 315 progressively reduces the rear engine speed.

Conveniently arranged next to the control lever 291 for raising and lowering the cutting edge, are the winch control levers. For example, a control lever 321 is effective upon a conventional valve 322 to govern the flow from a supply pipe 323 to either of the opposite ends of an actuating chamber 324 which is of a standard type repeatedly utilized in the structure and normally centralized to a neutral position by equally acting springs 326 and 327. When the valve 322 is maintained in neutral position by the median position of the lever 321, the winch is likewise in neutral position and transmits no power. However, when the lever 321 is rocked in one direction, air is admitted to one end of the chamber 324, thereby placing the winch in braked position, and when the lever 321 is swung to its opposite extreme position the winch is connected to power. Thus, the lever 321 is effective to control one of the winch drums, for example, drum 191. A lever 331 controls a standard valve 332 for regulating the supply and discharge of air to and from the opposite ends of an actuating chamber 333 which is effective to control operation of the winch drum 196, so that by operation of the grouped levers 291, 321 and 331, the operator can effectuate all of the usual controlling motions of the earth-carrying and handling structure.

Since the vehicle is designed to be operated as rapidly in a reverse direction as it is in forward direction, to obviate the necessity of turning around, the control of the reversing clutch 101 for the front engine and of the corresponding clutch for the rear engine is simultaneously effectuated. A reversing lever 334 controls a standard valve 336 to provide any one of three positions thereof. In an intermediate, neutral position, air from the main 323 is excluded from a front operating chamber 337 as well as from a rear operating chamber 338. The piston in each of these chambers is spring-centralized, as previously described, when no air pressure is exerted thereupon. The chamber 337, for example, is effective to hold the shifting fork 192 of the front reversing structure in neutral position, as shown in Fig. 5. The chamber 338 for the rear structure is identical in operation.

When, therefore, the lever 334 is moved in one direction out of central position, air is admitted to one end of both of the operating chambers 337 and 338, and the shifting forks are effective to connect the structure for motion in one direction, for example, forwardly. When the control lever 334 is shifted to its opposite extreme position, the air is released from the previously charged end of the operating chambers 337 and 338 and pressure air is simultaneously introduced into the opposite ends thereof so that the shifting forks controlled thereby are simultaneously shifted into opposite extreme positions and a reverse coupling or direction of drive is effectuated. Thus, the direction of advance of the vehicle is under the control of the operator by a single lever, although other parts of the drive are quite separate.

While the reversing clutches have a slight slippage at very high torques, the shift due to the pneumatic controllers 337 and 338 is relatively abrupt, and excessive momentary torque is primarily absorbed in the two liquid couplings, one for each power plant. Since these liquid couplings are in part responsive to centrifugal forces, dependent upon the speed of the respective engines, and since the engines are individually controlled through the controllers 251 and 257, it is possible, by manually or automatically minimizing the power output of one engine, for example, the rear engine during very sharp turns, to drive substantially by the other or front engine alone, so that the direction of rotation of the rear wheels relative to each other and relative to the rear engine is not particularly material. That is, one engine, when operating relatively slowly, is substantially uncoupled by the hydraulic coupling, so that the remaining mechanism may be operated in a reverse direction without affecting the one engine.

For example, when the front wheels are turned substantially at 90 degrees to the longitudinal direction of the vehicle, the rear engine can be idle and the front engine can be operated at considerable speed and power output so as to be coupled with the front wheels. The front drive can then be alternated between forward and reverse, to move the forward end of the vehicle in an arcuate path substantially about the center of the rear wheel axis as a turning pivot. But at this time the rear engine, although being reversely and forwardly related to its ground-engaging wheels along with the front engine, is substantially ineffective upon the rear wheels because its low speed effectuates a hydraulic uncoupling. Under these conditions the rear differential is also unlocked. The front end of the vehicle can be operated substantially at right angles and with full power output. This is of considerable importance in maneuvering in cramped quarters and where the ground conditions are quite irregular. Thus, by reason of the common reverse of the two engines but of the separate control of the power output of each and the automatic uncoupling feature of the hydraulic couplings at low engine speeds, there is provided a somewhat interrelated but extremely flexible and maneuverable power transmission system for the excavator.

The hydraulic coupling characteristics, in addition to slippage at low speeds, are of any selected sort, and the coupling may have turbine or torque multiplying characteristics. The illustration, such as Fig. 5, is diagrammatic but discloses a type in which there is very little torque multiplication but in which the centrifugal coupling is extremely effective. If no material torque multiplication is provided by the hydraulic coupling, we provide other means for changing the torque ratios. In the present instance, therefore, where the hydraulic coupling itself has very little torque changing characteristic, we provide the eight-speed transmission or some equivalent gear-change mechanism which is preferably partly automatic and partly under the control of the vehicle operator.

The particular ratio of the front transmission in the casing 111 which is effective at any one time is controlled by a valve shaft 341 rotatable by an operator's control lever 342 or by an operating rod 343 regulated by a speed-responsive governor 344 actuated by the front ground-engaging wheels 13. Thus the position of the shaft 341 is responsive to the speed of the front ground-engaging wheels. That is, the greater the speed of the front wheels 13, the more the shaft 341 is rotated from its zero position. But it may be restrained in any selected position by the vehicle operator holding the lever 342, either by hand or with a latching structure (not shown). If the lever 342 is held, the corresponding transmission remains in the selected ratio, but if the lever 342 is free then the particular ratio depends upon the front-wheel speed. Under governor control, however, the lever does not go into zero position, but at lowest wheel speed, or stopped, the lever occupies first speed position. Manual positioning of the lever in zero position, or neutral, is entirely possible.

In a quite similar fashion, the control rod 279 from the governor 278 which is responsive to the speed of the rear ground-engaging wheels 12, extends to and is effective upon the valve control shaft 346 for the rear transmission. A manual controller 347 is in all respects comparable to the controller 342 and is located in juxtaposition therewith so that the two controllers 342 and 347 can be simultaneously actuated by the operator, or can be simultaneouly latched in position, or can be individually located so that under rather unusual operating conditions the ratio of power transmission between the front engine and the front wheels is different from the ratio of power transmission between the rear engine and the rear wheels. Normally, however, both engines are free to transmit power through the same or approximately the same ratio under automatic wheel-speed responsive control.

Since the servo mechanism for translating the position of the shaft 341 into gear positions in the front transmission is substantially the same as the servo mechanism for translating the position of the controlling shaft 346 into corresponding gear positions in the rear transmission, a description of but one of them applies to both. For example, air from the main 323 is conducted through supply pipes 351, 352 and 353 to each of three valves 354, 355 and 356 having substantally the same rotors but having somewhat different valve casings. The valve 354 is provided with but two ports, one port 357 being connected by a conduit 358 to one end of an actuating chamber 359 comparable to the chamber 324 but connected to the shifting fork 113, for example. The piston in the chamber 359 is ordinarily in a neutral position, but when air is applied to one end of the chamber it is shifted into one extreme position, and that is what occurs when the valve 354 is first rotated out of its zero position. The valve 354 likewise has a port 361 connected by a duct 362 with the opposite end of the chamber 359.

The valve 355 is provided with alternating and spaced ports 363 and 364 which are connected by ducts 366 and 367 joining in a pipe 368 to one end of a control chamber 369. Interspersed ports 371 and 372 join in a duct 373 connected to the opposite end of the control chamber 369. The piston of this chamber is effective upon the shifting fork 122.

The valve 356 is provided with a series of alternate ports 381, 382, 383 and 384, each of which is joined by its individual pipe to a duct 386 extending to one end of a controller 387 effective upon the shifting fork 131. The valve 356 intermediate each of the ports 381, 382, 383 and 384 is provided with a series of ports 388, 389, 391 and 392 each of which is connected by its individual pipe to a duct 393 extending to the opposite end of the controller 387.

Since the ratio-changing transmission has eight speeds, the control shaft 341 has nine positions. The initial or zero position is illustrated in Fig. 10 in which none of the valves is in a position to supply air and all of the control chambers 359, 369 and 387 are in neutral position with the various shifting forks 113, 122 and 131 likewise in neutral position so that none of the gears is in power-transmitting position. When, however, the shaft 341 is moved into its first position, air pressure is transmitted through the port 357, through the port 363, and through the port 381 simultaneously, in order to establish corresponding positions of the control chambers and the respective shifting forks. When the shaft 341 is moved to its second position, the ports 357 and 363 remain effective, but the port 388 becomes effective. In the third position, while the port 357 is still effective, the port 371 then becomes effective and the port 382 is effective, thereby duplicating the function of the port 381. In fourth position, the port 354 remains effective, the port 371 remains effective, but the port 389 is effective as previously the port 388 was effective. In fifth position, the port 361 becomes effective, the port 364 becomes effective in the fashion of the original port 363, while port 383 is effective. In sixth position, port 361 is effective, port 364 remains effective, but port 391 is effective. In seventh position, port 361 is effective, but port 372 then becomes effective, while port 384 is connected. In eighth position, port 361 is effective, port 372 remains effective, while port 392 is effective.

In this fashion, the shifting fork 113 remains in one extreme position for the first four speeds and then occupies a second extreme position for the second four speeds. The shifting fork 122 occupies one extreme position for the first two speeds, occupies its other extreme position for the next two speeds, then the first extreme position for the subsequent pair of speeds, and finally the second extreme position for the ultimate pair of speeds. The shifting fork is alternately moved from one extreme position to the other as the range of speeds is traversed. Thus, in response to the position of the shaft 341, the ratio of speeds between the front engine and the front ground-engaging wheels is automatically or manually controlled. Since the controlling structure for the rear ratio-changing transmission is identical, the position of the shaft 346 similarly controls the ratio betwen the rear engine and the rear ground-engaging wheels, either automatically or manually.

Particularly under favorable or normal operating conditions, the speed transmissions and hydraulic couplings provide an automatic connection between the engines and the remaining driving structure, so that the operator of our excavator need concern himself primarily with but the steering, braking and throttle controls 257 and 251. He, therefore, can give plenty of attention to and has adequate time to operate the winch and hydraulic elevating structures of the earth-carrying portion of the machine. He is precluded from steering excessively at relatively high speeds and is given the assistance of maximum drive and traction by virtue of the locking differentials under most conditions. Under extreme conditions, however, the manual controls are available for producing individual driving effects, so that the full capabilities of the excavator can be obtained.

Figure 8:
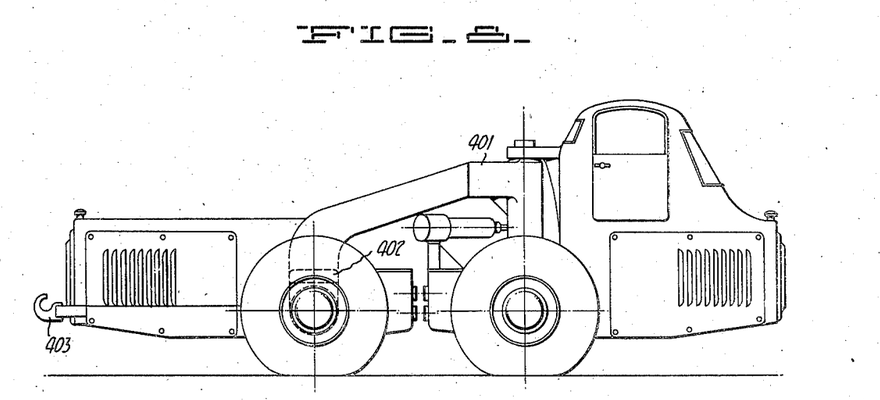
Fig. 8 is a side elevation of a motor vehicle preferably for use with our excavator.

Under extreme operating conditions, or in certain environments, it is advisable to have an auxiliary power structure, and we have, therefore, illustrated in Fig. 8 a device which is substantially the same as previously described in all respects except that the main frame structure 401 is not articulated between its ends and is not provided with any earth handling structure but rather extends simply as a frame to a rigid connection at 402 with the rear engine unit. This vehicle is preferably provided with a rear hook 403 for facilitating a draft connection with the front end of the excavating vehicle shown in the remaining figures.

Under some operating conditions, it is considered advisable to provide means for regulating the position of the main bowl 14 with respect to the ground, especially during cutting or excavating, in accordance with the load as represented by the speed of advance of the vehicle. That is, under conditions where very hard going is encountered, the governed engines furnish maximum power but this may be insufficient to maintain the speed of the vehicle and slower progress is made. Under such circumstances, it is often advantageous to reduce the depth of cutting in order to maintain the rate of advance of the vehicle. This is effectuated automatically, although manual supervision is retained.

Conversely, if the going is particularly easy, the cutting depth can be increased without reducing the speed of advance of the vehicle, and under those circumstances we provide a mechanism which automatically will increase the depth of cut so as to ensure that under all circumstances the vehicle is making the best use of the maximum power available from the power source. Most of the time the manual supervision can be omitted and the automatic mechanism relied upon, but there are often unusual circumstances which can best be met by manually controlled means.

Figure 11:
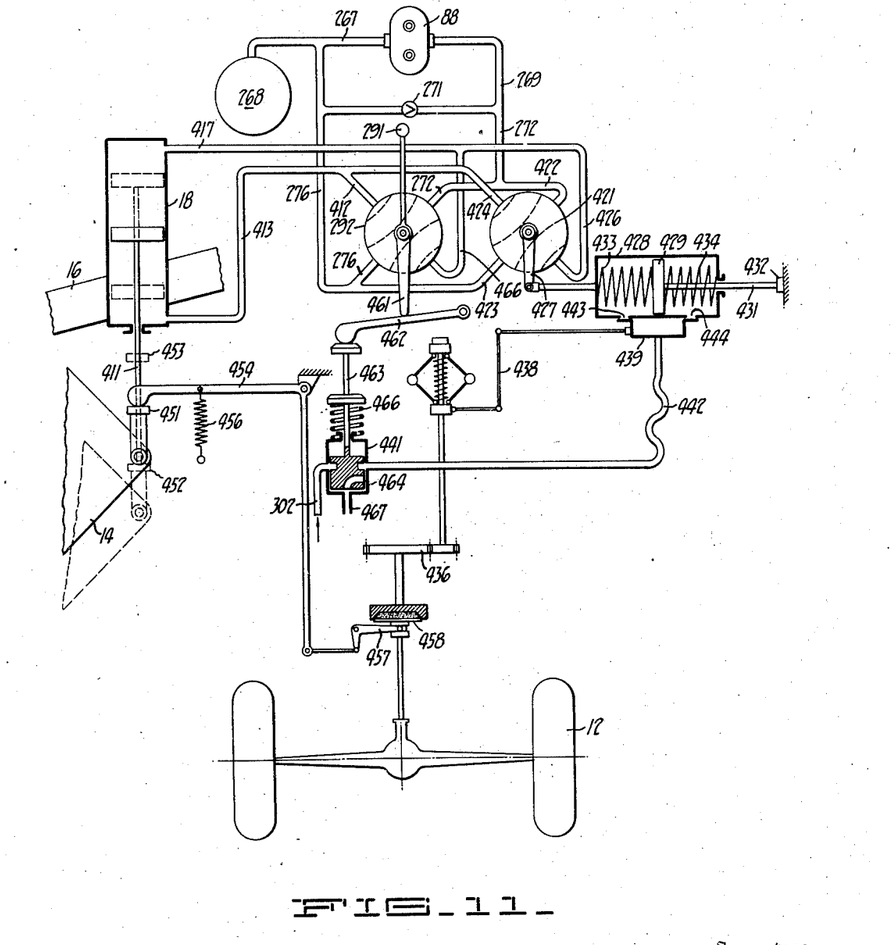
Fig. 11 is a schematic diagram of additional controls of our excavator especially for regulating the amount of excavation.

Since this arrangement can be applied to or omitted from the mechanism without substantially altering the remaining portions thereof, it is shown in a separate diagram in Fig. 11, it being understood that this structure preferably is added to the structure as diagrammatically illustrated in Fig. 10. As illustrated in Fig. 11, the main bowl 14 is movable vertically with respect to the main frame 16, in order to move the cutting edge with respect to the ground, and this motion is preferably effectuated by the cylinder and piston arrangement 18 which is connected to the main bowl 14 by a piston rod 411 and which is hydraulically operated.

The hydraulic liquid is obtained from the storage tank 268 from which it is conducted through the pipe 267 to the force pump 88 and is discharged therefrom under pressure through conduit 269 past the by-pass valve 271 and into the controlling valve 292 through the pipe 272. From the valve 292, which is operated by the hand controller 291, discharge either is through a pipe 412 into a duct 413 leading to the bottom of the cylinder 18 and which when connected is effective to lift the piston rod 411 and correspondingly to raise the main bowl 14, or, in the alternative, is through a duct 416 into a pipe 417 leading to the top of the cylinder 18 and effective to depress the main bowl 14 with respect to the ground. Thus, by operating the hand control 291, as previously described, the operator may, by hydraulic power, raise and lower the main bowl 14 not only with respect to the main frame 16 but also with respect to the ground.

In order to provide an automatically effective means, we preferably provide a second control valve 421 arranged generally in parallel with the valve 292. The construction of the valve 421 is like that of the valve 292 and hence it receives fluid under pressure from the duct 272 through a branch duct 422 and is similarly connected to the discharge pipe 276 by a branch discharge pipe 423. In a comparable fashion the valve 421 is connected to raise the main bowl 14 by supplying fluid to the duct 413 through a branch duct 424, while the valve is connected to lower the main bowl 14 by supplying fluid to the line 417 through a branch line 426. The control valve 421 is not provided with any manual lever but is operated by power since its operating lever 427 is connected to a movable cylinder 428 within which a piston 429 is stationarily established by a piston rod 431 fastened to a fixed support 432. The cylinder 428 is centralized with respect to the piston 429 by interior springs 433 and 434.

Movement of the cylinder 428 is preferably in response to the speed of a ground-engaging wheel, such as one of the rear wheels 12, through the medium of a servo or power multiplying mechanism. Rotation of the ground-engaging wheel 12 is normally effective through multiplying gearing 436 to drive a sensitive governor 437 at a relatively high speed. The multiplying mechanism 436 is desirable since during excavation the speed of advance of the vehicle is usually relatively slow and it is advisable, consequently, to make the governor highly responsive during low-speed operation. The governor 437 is connected through linkage 438 to a slide valve 439 governing the supply to and exhaust from the cylinder 438 of a pressure fluid, such as air. This air is supplied from the source through the duct 302 under the control of a valve 441 which communicates with the movable valve 439 through a flexible duct 442.

The operation of the mechanism is such that, as the vehicle wheel speed 12 increases, the governor 437 correspondingly changes its position and moves the valve 439 correspondingly. This movement displaces the valves 439 toward the right, as seen in Fig. 11, uncovering the cylinder 428 to the left of the piston 429 to the atmosphere through a port 443 and simultaneously uncovering a port 444 in the right-hand side of the chamber 428 to the supply of pressure air through the valve 439. This produces a corresponding translation of the cylinder 428 in exact proportion to the movement of the valve 439 responsive to the governor, and the cylinder movement rotates, through the lever 427, the valve 421 so that communication is established between the supply duct 422 and the lowering duct 426, while fluid discharge also occurs from the other end of the cylinder 428, thereupon causing the main bowl 14 to lower with respect to the ground or to cause the cutting edge to engage the ground more deeply. This normally increases the load upon the vehicle and slows its advance to the optimum value.

When the speed of the vehicle is less than the optimum value and the wheel 12 drops below that speed, the governor 437 is correspondingly affected, and the valve 439 is translated toward the left in Fig. 11, thereby exposing the port 444 to atmosphere and connecting the port 443 to the supply of air, thereby displacing the movable cylinder 428 toward the left in the figure, rotating the valve 421 in a clockwise direction, and connecting the supply duct 422 to the raising duct 424. Thus, when the speed of the vehicle drops below the optimum value the main bowl 14 is raised and the cutting edge is lifted with respect to the ground, thereby normally decreasing the load upon the engine and permitting the vehicle speed to be restored.

In accordance with the operation of this mechanism, the position of the main bowl is maintained at a value which will afford substantially a constant speed of advance of the vehicle without operator's supervision and automatically.

But since such automatic regulation is of value chiefly during excavation, and since the sensitive governor 437 may be damaged by over-speeding when the vehicle is transporting a load or dumping a load, we provide means for disabling the automatic structure except during excavation. The piston rod 414 carries a collar 451 which moves with such rod between the maximum excavating position indicated by the dotted lines 452 in Fig. 11, between the maximum raised position indicated by the dotted lines 453 in that figure, and the intermediate position shown by the solid lines in Fig. 11 wherein the cutting edge is supposedly substantially flush with the surface of the ground.

As the collar 451 rises from the central position illustrated, wherein the cutting edge is substantially even with the surface of the ground, it engages and lifts with it a lever 454 against the urgency of a spring 456, and the motion of the lever is transmitted through linkage 457 to disengage a driving clutch 458 interposed in the drive line between the rear wheels 12 and the multiplication gearing 436. Thus, as the main bowl 14 rises above its ground-level position, the clutch 458 is disengaged and no motion is transmitted to the governor 437. Under these circumstances, in the event no manual control is exercised, the operation of the governor is such as to produce an extreme displacement of the valve 439 so that the valve 421 is rotated to bring the main bowl 14 to its maximum elevated position for carriage. Whenever the governor is brought to its declutched or stationary position, as, for example, when the cutting edge strikes an obstruction, or when the load is so great as to slow the vehicle materially, a similar operation of the valve 439 promptly brings the bowl to highest carrying position.

When the main bowl 14 is lowered to and below the central position, and as the collar 451 descends, the spring 456 is effective upon the lever 454 and the linkage 457 to engage the clutch 458 and to bring the governor 437 up to speed. Below the central position, therefore, the operation is automatically controlled.

Manual control by the lever 291 at all times supersedes automatic control when the operator so desires, and to effectuate that condition the lever 291 is provided with an extension 461 adapted to cam against a lever 462 bearing upon the end of a valve stem 463 joined to the valve 464. The valve is ordinarily pressed by a spring 466 into an uppermost position against the lever 462 which in turn presses against the extension 461. When the hand control lever 291 is in its central or neutral position, so that the valve 292 is ineffective to produce any movement of the main bowl 14, the lever 462 is depressed, as is the stem 463, against the urgency of the spring 466, so that the valve 464 permits free communication of air from the duct 302 to the valve 439 and the servo cylinder 428. Thus, when the hand controller 291 is in a central or inactive position, the automatic mechanism can operate without restriction. But when the hand controller 291 is moved in either direction from its neutral position, the immediate effect is for the extension 461 to permit the lever 462 to rise with the stem 463 under the urgency of the spring 466. Simultaneously, the valve 464 rises, thereby cutting off communication from the source of air 302 to the servo valve 439 and connecting such valve to atmosphere through a drain duct 467. Since, therefore, despite the position momentarily of the valve 439, the cylinder 428 is connected on both sides of the piston 429 to atmosphere, the centralizing springs 433 and 434 are effective instantly to restore the automatic valve 421 to a central, neutral or ineffective position, and the manual control lever 291 is the sole means of producing motion of the main bowl 14. As soon, however, as manual control of the lever 291 is relinquished, or the lever is restored to its central neutral position, the valve 464 is again positioned so that the valve 439 is supplied with air and the automatic servo mechanism is restored to effectiveness.

By the provision of this mechanism, therefore, it is possible to have the maximum utilization of the engine power, as measured by the speed of advance of the vehicle, effective to control the depth of cut or, in general, the position of the main bowl 14, although manual supervision is retained and the automatic control is made ineffective except for a portion of the range of movement of the main bowl with respect to the ground.

We claim:

1. A vehicle comprising: a frame; rear wheels for supporting said frame; a first means connected to drive said rear wheels; front wheels for supporting and steering said frame; a second means connected to drive said front wheels; means for steering said front wheels; and means responsive to the steering of said front wheels for altering the driving connection of said second means to said front wheels.

2. A vehicle comprising: a frame; rear wheels for supporting said frame; a first means connected to drive said rear wheels; front wheels for supporting and steering said frame; a second means connected to drive said front wheels; means for steering said front wheels; and means responsive to the steering of said front wheels for altering the driving connection of said first means to said rear wheels.

3. A vehicle comprising: a frame; rear wheels for supporting said frame; a first means connected to drive said rear wheels; front wheels for supporting and steering said frame; a second means connected to drive said front wheels; means for steering said front wheels; and means responsive to the steering of said front wheels for altering the driving connection between said second means and said front wheels and between said first means and said rear wheels.

4. A vehicle comprising: a frame; rear wheels for supporting said frame; a first means carried by said frame and arranged to drive said rear wheels; dirigible front wheels for supporting said frame; a second means arranged to drive said front wheels; means for steering said dirigible wheels; and means responsive to the steering of said front wheels a predetermined amount for altering the driving connection between said second means and said front wheels.

5. A vehicle comprising: a main frame and main body structure; rear wheels for supporting said structure; a first means connected to drive said rear wheels; front wheels for supporting and steering said structure; a second means connected to drive said front wheels; means for steering said front wheels; and means responsive to the steering of said front wheels a predetermined amount for altering the driving connection of said second means to said front wheels and responsive to the steering of said front wheels a different amount for altering the driving connection of said first means to said rear wheels.

6. A vehicle comprising: a frame; rear wheels for supporting said frame; a first means for driving said rear wheels; a rear differential for variably dividing power from said first means between said rear wheels; a rear differential lock for disabling said rear differential; front wheels for supporting said frame; a second means for driving said front wheels; a front differential for variably dividing power from said second means between said front wheels; a front differential lock for disabling said front differential; and common control means for operating said front and rear differential locks.

7. A vehicle comprising: a frame; rear wheels for supporting said frame; a first means for driving said wheels; a rear ratio-changing transmission for transmitting power from said first means to said rear wheels; means responsive to the speed of said rear wheels for controlling said transmission; a rear reversing mechanism interposed between said first means and said transmission; front wheels for supporting said frame; a second means for driving said front wheels; a front ratio-changing transmission for transmitting power from said second means to said front wheels; a front reversing mechanism interposed between said second means and said front transmission; means responsive to the speed of said front wheels for controlling said front transmission; and common control means for operating said rear reversing mechanism and said front reversing mechanism.

8. A vehicle comprising: a frame; rear wheels for supporting said frame; a first means for driving said rear wheels; a rear differential for variably dividing power from said first means between said rear wheels; a rear differential lock for disabling said rear differential; front wheels for supporting said frame; a second means for driving said front wheels; a front differential for variably dividing power from said second means between said front wheels; a front differential lock for disabling said front differential; means for steering said front wheels; and means responsive to said steering means for operating said front and rear differential locks and for controlling said first means.

9. A vehicle comprising: a frame; rear wheels for supporting said frame; front wheels for supporting and steering said frame; driving means connected to drive said front wheels; means for steering said front wheels; and means responsive to the steering of said front wheels for altering the connection of said driving means to said front wheels.

10. A vehicle comprising: a frame; rear wheels for supporting said frame; front wheels for supporting and steering said frame; driving means connected to drive said rear wheels; means for steering said front wheels; and means responsive to the steering of said front wheels for altering the connection of said driving means to said rear wheels.

11. A vehicle comprising a frame; rear wheels for supporting said frame; dirigible front wheels for supporting said frame; means for steering said front wheels into a position with the planes of said wheels approximately transverse of said vehicle; means for driving all of said wheels; and means for altering the driving of said rear wheels in response to said steering means.

12. A vehicle comprising a frame; rear wheels for supporting said frame; dirigible front wheels for supporting said frame; means for steering said front wheels into a position with the planes of said wheels approximately transverse of said vehicle; means for driving all of said wheels, and means for substantially releasing said rear wheels from said driving means upon steering of said front wheels approximately into said position.

R. E. CHOATE.
ELLSWORTH W. AUSTIN.